US012629974B2

(12) United States Patent
Lee et al.

(10) Patent No.: US 12,629,974 B2
(45) Date of Patent: May 19, 2026

(54) BUMP STOPPER FOR VEHICLE

(71) Applicants: Hyundai Motor Company, Seoul
(KR); Kia Corporation, Seoul (KR)

(72) Inventors: Chang Sin Lee, Hwaseong-si (KR);
Sang Hoon Yoo, Anyang-si (KR); **Jong
Min Kim**, Seoul (KR)

(73) Assignees: Hyundai Motor Company, Seoul
(KR); Kia Corporation, Seoul (KR)

( * ) Notice: Subject to any disclaimer, the term of this
patent is extended or adjusted under 35
U.S.C. 154(b) by 601 days.

(21) Appl. No.: 18/178,012

(22) Filed: Mar. 3, 2023

(65) Prior Publication Data

US 2024/0123784 A1 Apr. 18, 2024

(30) Foreign Application Priority Data

Oct. 18, 2022 (KR) ........................ 10-2022-0134242

(51) Int. Cl.
B60G 7/04 (2006.01)

(52) U.S. Cl.
CPC .......... B60G 7/04 (2013.01); B60G 2202/143
(2013.01); B60G 2204/125 (2013.01); **B60G
2204/4502 (2013.01); B60G 2206/73** (2013.01)

(58) Field of Classification Search
CPC .. F16F 1/3735; F16F 9/58; B60G 7/04; B60G
2202/143; B60G 2204/125; B60G
2204/4502; B60G 2206/73
USPC ........................................................ 267/139
See application file for complete search history.

(56) References Cited

U.S. PATENT DOCUMENTS

| | | | | |
|---|---|---|---|---|
| 3,622,194 | A | * | 11/1971 | Bryk .................... B60G 99/004 |
| | | | | 411/965 |
| 5,170,985 | A | * | 12/1992 | Killworth ............. F16B 5/0258 |
| | | | | 267/141.1 |
| 5,799,930 | A | * | 9/1998 | Willett .................... F16F 3/093 |
| | | | | 267/141.5 |
| 7,338,040 | B2 | * | 3/2008 | Schleck .................... F16F 9/58 |
| | | | | 280/124.179 |
| 7,503,552 | B2 | * | 3/2009 | Huprikar ................... F16F 1/37 |
| | | | | 267/141.1 |
| 2008/0012188 | A1 | * | 1/2008 | Dickson ................ F16F 1/3732 |
| | | | | 267/139 |
| 2008/0136076 | A1 | * | 6/2008 | Cummings ............... F16F 9/58 |
| | | | | 267/293 |
| 2018/0339563 | A1 | * | 11/2018 | Celaya Arrizabalaga ................... |
| | | | | B60G 13/003 |
| 2020/0307335 | A1 | * | 10/2020 | Roth ........................ F16F 1/374 |
| 2022/0234405 | A1 | * | 7/2022 | Heidemann ............. F16F 1/377 |

FOREIGN PATENT DOCUMENTS

| | | | | | |
|---|---|---|---|---|---|
| JP | S6177505 | A | * | 4/1986 | |
| JP | 3525567 | B2 | * | 5/2004 | ............... F16F 1/38 |
| KR | 20130039526 | A | | 4/2013 | |

* cited by examiner

*Primary Examiner* — Robert A. Siconolfi
*Assistant Examiner* — San M Aung
(74) *Attorney, Agent, or Firm* — Slater Matsil, LLP

(57) ABSTRACT

A bump stopper can be provided for a vehicle. The bump
stopper includes an upper part, a lower part, and a connec-
tion member. The upper part and the lower part are stacked
vertically and have double density. The connection member
is positioned at an interface between the upper part and the
lower part to connect the upper part and the lower part.

20 Claims, 2 Drawing Sheets

BUMP STOPPER FOR VEHICLE

CROSS-REFERENCE TO RELATED APPLICATIONS

The present application claims priority to Korean Patent Application No. 10-2022-0134242, filed Oct. 18, 2022, the entire contents of which is incorporated herein for all purposes by this reference.

TECHNICAL FIELD

The present invention relates to a bump stopper for a vehicle.

BACKGROUND

In general, a suspension system refers to a device that is provided in a vehicle and prevents vibration or impact applied from a road surface from being transmitted directly to a vehicle body while the vehicle travels, thereby preventing damage to the vehicle body or freight and improving ride quality.

A bump stopper, which is a constituent element of the suspension system, serves to assist in improving ride quality and handling performance by restricting maximum ascending strokes (bump strokes) of a shock absorber and a spring during a wheel motion of the vehicle. In particular, the bump stopper serves as an auxiliary spring and affects vehicle characteristics together with a suspension spring.

As a stopper seat mounted on a suspension arm is moved upward by the motion of the vehicle wheel and brought into contact with the bump stopper, the maximum ascending strokes of the shock absorber and the spring are restricted.

That is, during the traveling of the vehicle, the vehicle wheel is moved upward and downward by a load transmitted from the road surface, and the suspension arm is rotated about a bushing, which is a coupling point with the vehicle body, by the upward and downward movements of the vehicle wheel. When the suspension arm rotates upward, the stopper seat mounted on the suspension arm comes into contact with the bump stopper fixed to the vehicle body, such that the maximum ascending strokes of the shock absorber and the spring are restricted.

Meanwhile, the spring properties may be set to be low by applying a low density to allow the bump stopper to contribute to the improvement of ride quality, and the spring properties may be set to be high by applying a high density to allow the bump stopper to contribute to the improvement of handling performance.

However, because the bump stopper in the related art has a single configuration to which a single density is applied, there is a problem in that it is difficult to satisfy both ride performance and handling performance of the vehicle.

The foregoing explained as the background is intended merely to aid in the understanding of the background of the present invention, and is not intended to mean that the present invention falls within the purview of the related art that is already known to those skilled in the art.

SUMMARY

Embodiments of the present invention relates to a bump stopper for a vehicle, and more particularly, to a technology associated with a bump stopper for a vehicle that adopts double density to satisfy both ride performance and handling performance of a vehicle.

Embodiments of the present invention can solve these problems and provide a bump stopper for a vehicle that adopts double density to satisfy both ride performance and handling performance of a vehicle, thereby improving marketability.

For example, a bump stopper for a vehicle according to an embodiment of the present invention may include upper and lower parts stacked vertically and having double density, and a connection member positioned on an interface between the upper and lower parts and configured to connect the upper and lower parts.

The upper part may have relatively higher density properties than the lower part, and the lower part may have relatively lower density properties than the upper part.

The connection member may be made of steel and coupled as an insert when the upper and lower parts are manufactured.

The connection member may include a body portion extending upward and downward from the interface between the upper and lower parts and configured to connect the upper and lower parts, and upper and lower protrusion portions protruding from upper and lower ends of the body portion toward a hollow portion disposed inside the upper and lower parts and configured to increase a coupling force with the upper and lower parts.

The connection member may be positioned in cross-sectional thicknesses of the upper and lower parts without being exposed to the outside.

An outer surface of the body portion may be formed as a flat surface to prevent a gap from being formed between the connection member and the upper and lower parts when the upper and lower parts are compressed.

The connection member may include a body portion extending upward and downward from the interface between the upper and lower parts and configured to connect the upper and lower parts; upper and lower protrusion portions protruding from upper and lower ends of the body portion toward a hollow portion disposed inside the upper and lower parts and configured to increase a coupling force with the upper and lower parts; and a center protrusion portion protruding outward along the interface between the upper and lower parts from a middle point of the body portion and configured to prevent contact between the upper and lower parts.

The body portion, the upper protrusion portion, and the lower protrusion portion may be positioned in cross-sectional thicknesses of the upper and lower parts without being exposed to the outside, the center protrusion portion may extend along the interface between the upper and lower parts, and an end of the center protrusion portion may protrude outward and be exposed to the outside.

An outer surface of the body portion may be connected to upper and lower surfaces of the center protrusion portion, and the connected surfaces may be formed as flat surfaces to prevent a gap from being formed between the connection member and the upper and lower parts when the upper and lower parts are compressed.

The bump stopper for a vehicle according to the present invention includes the upper part having a high density and the lower part having a low density. Therefore, it is possible to satisfy both the ride performance and handling performance of the vehicle by using the upper and lower parts having the double density.

In addition, the bump stopper for a vehicle according to the present invention maintains the coupling force by using the connection member coupled, as an insert, to the upper part having a high density and the lower part having a low density. Therefore, the upper and lower parts having the double density may maintain the sufficient coupling force by using the connection member without using a separate bonding member such as a bonding agent.

In addition, according to the bump stopper for a vehicle according to the present invention, the outer surface of the connection member is formed as a flat surface, such that the contact area with the upper and lower parts may be increased, and the connection member may be in uniform contact with the upper and lower parts. Therefore, it is possible to prevent a gap from being formed between the connection member and the upper and lower parts when the bump stopper is compressed. Further, it is possible to prevent noise related to abnormal noise and improve durability.

DETAILED DESCRIPTION OF ILLUSTRATIVE EMBODIMENTS

Figure 1:
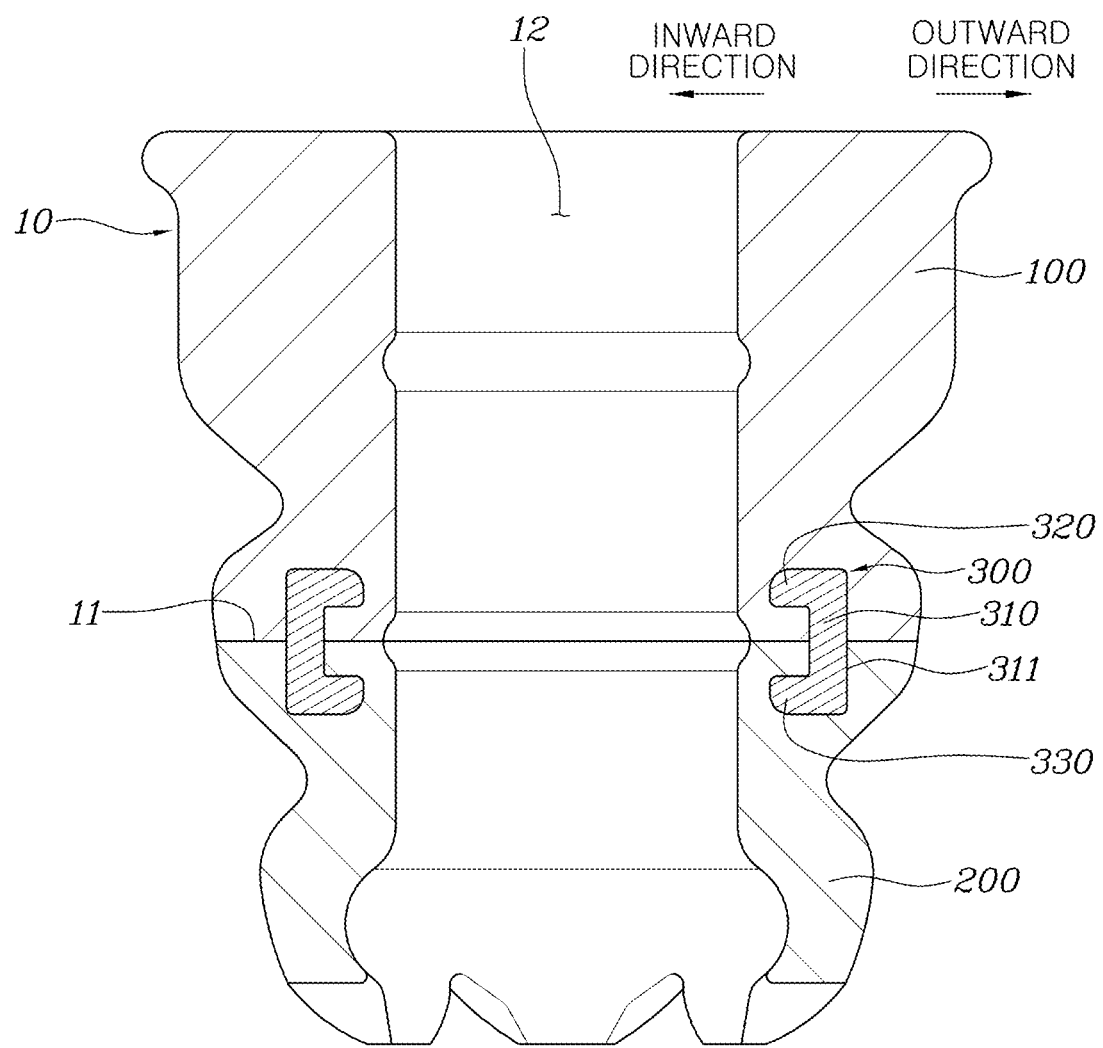
FIG. 1 is a view illustrating a bump stopper according to one embodiment of the present invention.

Hereinafter, embodiments disclosed in the present specification will be described in detail with reference to the accompanying drawings. The same or similar constituent elements are assigned with the same reference numerals regardless of reference numerals, and the repetitive description thereof will be omitted.

The suffixes 'module', 'unit', 'part', and 'portion' used to describe constituent elements in the following description are used together or interchangeably in order to facilitate the description, but the suffixes themselves do not have distinguishable meanings or functions.

In the description of the embodiments disclosed in the present specification, the specific descriptions of publicly known related technologies will be omitted when it is determined that the specific descriptions may obscure the subject matter of the embodiments disclosed in the present specification.

In addition, it should be interpreted that the accompanying drawings are provided only to allow those skilled in the art to easily understand the embodiments disclosed in the present specification, and the technical spirit disclosed in the present specification is not limited by the accompanying drawings, and includes all alterations, equivalents, and alternatives that are included in the spirit and the technical scope of the present invention.

The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or connected directly to another constituent element, and an intervening constituent element can also be present between the constituent elements.

When one constituent element is described as being "coupled directly to" or "connected directly to" another constituent element, it should be understood that no intervening constituent element is present between the constituent elements.

Singular expressions include plural expressions unless clearly described as different meanings in the context.

In the present specification, it should be understood the terms "comprises," "comprising," "includes, "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

In addition, the term "control unit" or "unit" including "motor control unit (MCU)" or "hybrid control unit (HCU)" is merely a term widely used to name a control device (controller or control unit) for controlling a particular vehicle function but does not mean a generic function unit.

The control unit (controller) may include a communication device configured to communicate with another control unit or a sensor to control a corresponding function, a memory configured to store an operating system, a logic instruction, and input/output information, and one or more processors configured to perform determination, computation, decision, or the like required to control the corresponding function.

Hereinafter, a bump stopper for a vehicle according to an exemplary embodiment of the present invention will be described with reference to the accompanying drawings.

Figure 2:
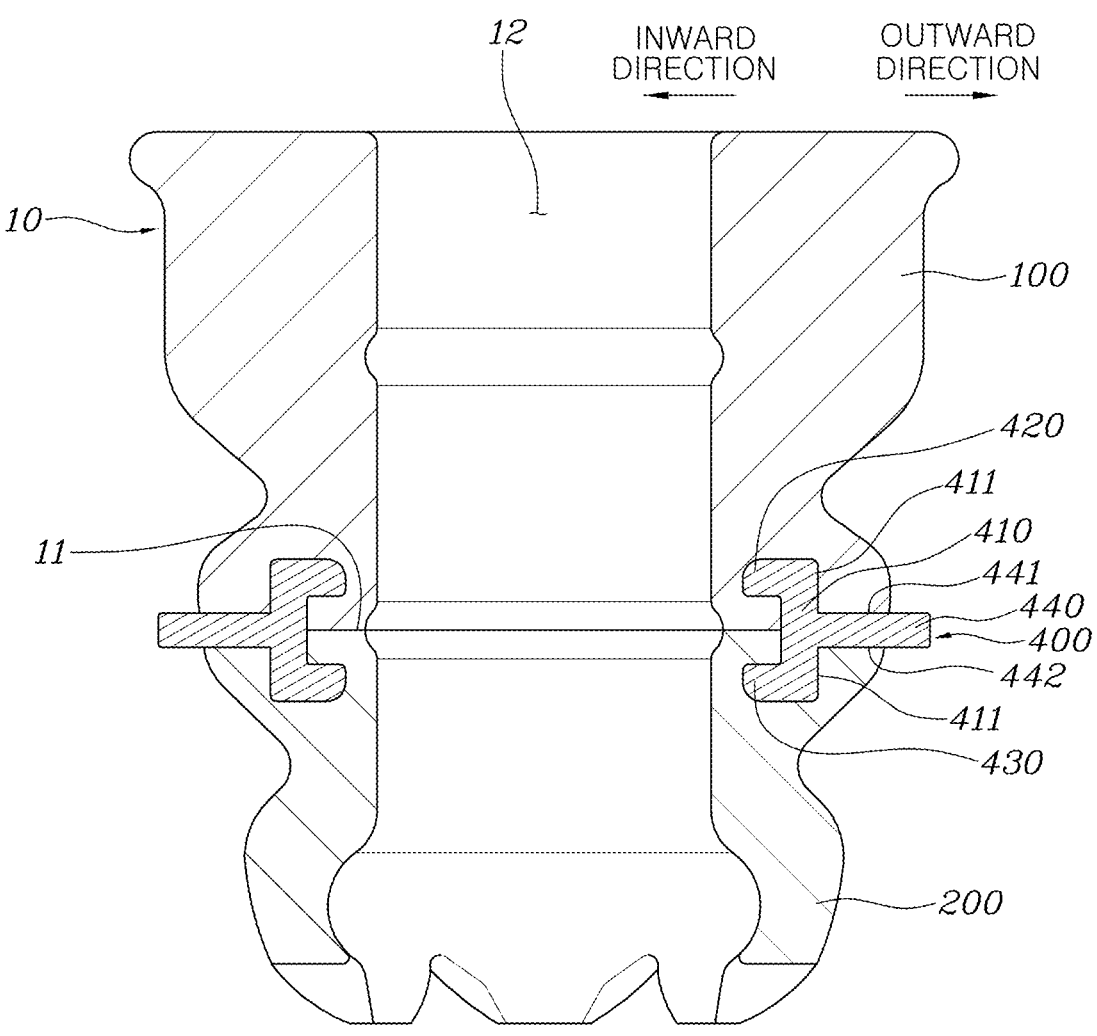
FIG. 2 is a view illustrating a bump stopper according to one embodiment of the present invention.

FIG. 1 illustrates a bump stopper according to a first embodiment of the present invention, and FIG. 2 illustrates a bump stopper according to a second embodiment.

The configuration of the bump stopper of the first embodiment and the configuration of the bump stopper of the second embodiment are identical to each other except for connection members.

As illustrated in FIG. 1, a bump stopper 10 of a first embodiment according to the present invention includes: upper and lower parts 100 and 200 stacked vertically and configured by double density; and a connection member 300 positioned on an interface ii between the upper and lower parts 100 and 200 and configured to connect the upper and lower parts 100 and 200.

The upper and lower parts 100 and 200 are made of an elastic material, and more specifically, made of, but not limited to, rubber.

The upper part 100 is configured to have relatively higher density properties than the lower part 200.

The upper part 100, related to handling performance, sets high spring properties by applying high density. The high spring properties strongly hold the posture of the vehicle in a high wheel stroke section when the vehicle turns, thereby ensuring stable handling performance.

The lower part 200 is configured to have relatively lower density properties than the upper part 100.

The lower part 200, related to the ride performance, sets low spring properties by applying low density. The low spring properties may ensure soft ride quality in a low wheel stroke section when the vehicle travels straight.

The connection member 300 needs to ensure sufficient strength and rigidity by connecting the upper and lower parts 100 and 200. To this end, the connection member 300 may be made of, but not limited to, steel.

During a process of manufacturing the upper and lower parts 100 and 200, the connection member 300 made of steel is coupled as an insert, thereby maintaining the coupled state of the upper and lower parts 100 and 200 with a sufficient coupling force.

Because the connection member 300 is coupled as an insert, the connection member 300 may maintain a sufficient coupling force applied to the upper and lower parts 100 and 200 without using a separate bonding member such as a bonding agent.

The connection member 300 of the first embodiment illustrated in FIG. 1 includes: a body portion 310 extending upward and downward from the interface ii between the upper and lower parts 100 and 200 and configured to connect the upper and lower parts 100 and 200; and upper and lower protrusion portions 320 and 330 protruding from upper and lower ends of the body portion 310 toward a hollow portion 12 disposed inside the upper and lower parts 100 and 200 and configured to increase the coupling force with the upper and lower parts 100 and 200.

An overall external shape of the connection member 300 according to the first embodiment is a circular ring shape. The connection member 300 is structured such that the body portion 310, the upper protrusion portion 320, and the lower protrusion portion 330 define a U-shaped cross-section.

The connection member 300 according to the first embodiment is entirely positioned in cross-sectional thicknesses of the upper and lower parts 100 and 200 without being exposed to the outside, thereby improving an external aesthetic appearance.

The body portion 310 extends upward and downward from the interface ii between the upper and lower parts 100 and 200 and serves to connect the upper and lower parts 100 and 200. The upper protrusion portion 320 protrudes inward from the upper end of the body portion 310 and serves to increase the coupling force with the upper part 100. The lower protrusion portion 330 protrudes inward from the lower end of the body portion 310 and serves to increase the coupling force with the lower part 200.

Catching structures implemented by the upper and lower protrusion portions 320 and 330 fix the upper and lower ends of the connection member 300 to the upper and lower parts 100 and 200 of the bump stopper 10, which makes it possible to prevent the withdrawal of the connection member 300 when the bump stopper 10 is stretched.

In addition, the catching structures implemented by the upper and lower protrusion portions 320 and 330 may allow the connection member 300 to maintain the sufficient coupling force applied to the upper and lower parts 100 and 200 of the bump stopper 10 without using a separate bonding member such as a bonding agent.

An outer surface 311 of the body portion 310 is formed as a flat surface extending upward and downward, such that a contact area with the upper and lower parts 100 and 200 may be increased. Therefore, it is possible to prevent a gap from being formed between the body portion 310 and the upper and lower parts 100 and 200 when the bump stopper 10 is compressed. Further, it is possible to prevent noise related to abnormal noise and improve durability.

FIG. 2 illustrates a bump stopper 10 having a connection member 400 according to a second embodiment.

The connection member 400 of the second embodiment differs from the connection member 300 of the first embodiment in that a center protrusion portion 340 is further formed. The connection member 400 of the second embodiment is identical to the connection member 300 of the first embodiment in that the body portion, the upper protrusion portion, and the lower protrusion portion are formed.

The connection member 400 of the second embodiment illustrated in FIG. 2 includes: a body portion 410 extending upward and downward from the interface ii between the upper and lower parts 100 and 200 and configured to connect the upper and lower parts 100 and 200; upper and lower protrusion portions 420 and 430 protruding from upper and lower ends of the body portion 410 toward the hollow portion 12 disposed inside the upper and lower parts 100 and 200 and configured to increase the coupling force with the upper and lower parts 100 and 200; and a center protrusion portion 440 protruding outward from a middle point of the body portion 410 along the interface ii between the upper and lower parts 100 and 200 and configured to prevent contact between the upper and lower parts 100 and 200.

The body portion 410, the upper protrusion portion 420, and the lower protrusion portion 430 of the connection member 400 according to the second embodiment are identical to the body portion 310, the upper protrusion portion 320, and the lower protrusion portion 330 of the connection member 300 of the first embodiment.

Therefore, like the connection member 300 of the first embodiment, an external shape of the connection member 400 of the second embodiment including the body portion 410, the upper protrusion portion 420, and the lower protrusion portion 430 has a circular ring shape having a U-shaped cross-section. Further, the center protrusion portion 440 further protrudes outward from the outer surface of the body portion 410.

The body portion 410, the upper protrusion portion 420, and the lower protrusion portion 430 of the connection member 400 according to the second embodiment are positioned in cross-sectional thicknesses of the upper and lower parts 100 and 200 without being exposed to the outside, thereby improving an external aesthetic appearance.

The body portion 410 extends upward and downward from the interface ii between the upper and lower parts 100 and 200 and serves to connect the upper and lower parts 100 and 200. The upper protrusion portion 420 protrudes inward from the upper end of the body portion 410 and serves to increase the coupling force with the upper part 100. The lower protrusion portion 430 protrudes inward from the lower end of the body portion 410 and serves to increase the coupling force with the lower part 200.

Catching structures implemented by the upper and lower protrusion portions 420 and 430 fix the upper and lower ends of the connection member 400 to the upper and lower parts 100 and 200 of the bump stopper 10, which makes it possible to prevent the withdrawal of the connection member 400 when the bump stopper 10 is stretched.

In addition, the catching structures implemented by the upper and lower protrusion portions 420 and 430 may allow the connection member 400 to maintain the sufficient coupling force applied to the upper and lower parts 100 and 200 of the bump stopper 10 without using a separate bonding member such as a bonding agent.

The center protrusion portion 440 protrudes outward along the interface ii between the upper and lower parts 100 and 200 from the middle point of the body portion 410 based on a vertical longitudinal direction of the body portion 410. An end of the center protrusion portion 440 protrudes outward from the bump stopper 10 and assuredly prevents the contact between the upper and lower parts 100 and 200.

A gap may be formed in the interface ii between the upper and lower parts 100 and 200 in case that the shape of the interface ii between the upper and lower parts 100 and 200 is not uniform in a situation in which the upper and lower parts 100 and 200 having different densities are compressed while coming into contact with each other when the bump stopper 10 is compressed. In this case, there are problems in that noise related to abnormal noise occurs and durability deteriorates.

In the embodiment according to the present invention, the center protrusion portion 440 of the connection member 400 may be used to assuredly separate the upper and lower parts 100 and 200 on the basis of the interface ii. Therefore, it is possible to prevent contact between the upper and lower parts 100 and 200 having the interface ii with the non-uniform shape, thereby preventing a gap from being formed in the interface ii between the upper and lower parts 100 and 200, which makes it possible to prevent the occurrence of noise related to abnormal noise.

In addition, in the connection member 400 of the second embodiment, an outer surface 411 of the body portion 410 is connected to upper and lower surfaces 441 and 442 of the center protrusion portion 440, and the connected surfaces are formed as flat surfaces, such that a contact area with the upper and lower parts 100 and 200 may be increased, and the connection member 400 may be in uniform contact with the upper and lower parts 100 and 200. Therefore, it is possible to prevent a gap from being formed between the connection member 400 and the upper and lower parts 100 and 200 when the bump stopper 10 is compressed. Further, it is possible to prevent noise related to abnormal noise and improve durability.

As described above, the bump stopper for a vehicle according to the present invention includes the upper part 100 having a high density and the lower part 200 having a low density. Therefore, it is possible to satisfy both the ride performance and handling performance of the vehicle by using the upper and lower parts 100 and 200 having the double density.

In addition, the bump stopper for a vehicle according to the present invention maintains the coupling force by using the connection member 300 or 400 coupled, as an insert, to the upper part 100 having a high density and the lower part 200 having a low density. Therefore, the upper and lower parts 100 and 200 having the double density may maintain the sufficient coupling force by using the connection member 400 without using a separate bonding member such as a bonding agent.

In addition, according to the bump stopper for a vehicle according to the present invention, the outer surface of the connection member 300 or 400 is formed as a flat surface, such that the contact area with the upper and lower parts 100 and 200 may be increased, and the connection member 300 or 400 may be in uniform contact with the upper and lower parts 100 and 200. Therefore, it is possible to prevent a gap from being formed between the connection member 300 or 400 and the upper and lower parts 100 and 200 when the bump stopper 10 is compressed. Further, it is possible to prevent noise related to abnormal noise and improve durability.

While the specific embodiments of the present invention have been illustrated and described, it will be obvious to those skilled in the art that the present invention may be variously modified and changed without departing from the technical spirit of the present invention defined in the appended claims.

What is claimed is:

1. A bump stopper for a vehicle, the bump stopper comprising:

an upper part;

a lower part, wherein the upper part and the lower part are stacked vertically and have double density; and a connection member positioned at an interface between the upper part and the lower part to connect the upper part and the lower part, wherein the connection member comprises:

a body portion extending upward and downward from the interface between the upper part and the lower part, the body portion being configured to connect the upper part and the lower part;

an upper protrusion portion protruding from an upper end of the body portion;

a lower protrusion portion protruding from a lower end of the body portion, the upper protrusion portion and the lower protrusion portion extending toward a hollow portion disposed inside the upper part and the lower part, and the upper protrusion portion and the lower protrusion portion being configured to increase a coupling force with the upper part and the lower part; and a center protrusion portion protruding outward along the interface between the upper part and the lower part from a middle point of the body portion, the center protrusion portion being configured to prevent contact between the upper part and the lower part.

2. The bump stopper of claim 1, wherein the upper part has relatively higher density properties than the lower part, and the lower part has relatively lower density properties than the upper part.

3. The bump stopper of claim 1, wherein the connection member is made of steel and coupled as an insert.

4. The bump stopper of claim 1, wherein the connection member is positioned in cross-sectional thicknesses of the upper part and the lower part without being exposed to the outside.

5. The bump stopper of claim 1, wherein an outer surface of the body portion is formed as a flat surface to prevent a gap from being formed between the connection member, the upper part, and the lower part when the upper part and lower part are compressed together.

6. The bump stopper of claim 1, wherein the body portion, the upper protrusion portion, and the lower protrusion portion are positioned in cross-sectional thicknesses of the upper part and the lower part without being exposed to the outside; and wherein the center protrusion portion extends along the interface between the upper part and the lower part, and an end of the center protrusion portion protrudes outward and is exposed to the outside.

7. The bump stopper of claim 1, wherein an outer surface of the body portion connects to an upper surface and a lower surface of the center protrusion portion to form flat surfaces to prevent a gap from being formed between the connection member, the upper part, and the lower part when the upper part and the lower part are compressed together.

8. The bump stopper of claim 1, wherein the connection member comprises an external circular ring shape having a U-shaped cross-section.

9. The bump stopper of claim 1, wherein the upper part and the lower part comprise an elastic material.

10. The bump stopper of claim 9, wherein the upper and lower protrusion portions are configured to fix the upper and lower ends of the body portion to the upper and lower parts of the bump stopper to prevent withdrawal of the connection member when the bump stopper is stretched.

11. A vehicle suspension structure comprising:

a suspension arm;

a stopper seat configured to mount on the suspension arm; and a bump stopper configured to receive contact from the stopper seat, wherein the bump stopper comprises:

an upper part;

a lower part, wherein the upper part and the lower part are stacked vertically and have double density; and a connection member positioned on an interface between the upper part and the lower part to connect the upper part and the lower part, wherein the connection member comprises:

a body portion extending upward and downward from the interface between the upper part and the lower part, the body portion being configured to connect the upper part and the lower part;

an upper protrusion portion protruding from an upper end of the body portion;

a lower protrusion portion protruding from a lower end of the body portion, the upper protrusion portion and the lower protrusion portion extending toward a hollow portion disposed inside the upper part and the lower part, and the upper protrusion portion and the lower protrusion portion being configured to increase a coupling force with the upper part and the lower part; and a center protrusion portion protruding outward along the interface between the upper part and the lower part from a middle point of the body portion, the center protrusion portion being configured to prevent contact between the upper part and the lower part.

12. The structure of claim 11, wherein the upper part has relatively higher density properties than the lower part, and the lower part has relatively lower density properties than the upper part.

13. The structure of claim 11, wherein the connection member is made of steel and coupled as an insert.

14. The structure of claim 11, wherein the connection member is positioned in cross-sectional thicknesses of the upper part and the lower part without being exposed to the outside.

15. The structure of claim 11, wherein an outer surface of the body portion is formed as a flat surface to prevent a gap from being formed between the connection member, the upper part, and the lower part when the upper part and the lower part are compressed together.

16. The structure of claim 11, wherein the body portion, the upper protrusion portion, and the lower protrusion portion are positioned in cross-sectional thicknesses of the upper part and the lower part without being exposed to the outside, and wherein the center protrusion portion extends along the interface between the upper part and the lower part, and an end of the center protrusion portion protrudes outward and is exposed to the outside.

17. The structure of claim 11, wherein an outer surface of the body portion connects to an upper surface and a lower surface of the center protrusion portion to form flat surfaces to prevent a gap from being formed between the connection member, the upper part, and the lower part when the upper part and the lower part are compressed together.

18. The structure of claim 11, wherein the connection member comprises an external circular ring shape having a U-shaped cross-section.

19. The bump stopper of claim 11, wherein the upper part and the lower part comprise an elastic material.

20. The structure of claim 19, wherein the upper and lower protrusion portions are configured to fix the upper and lower ends of the body portion to the upper and lower parts of the bump stopper to prevent withdrawal of the connection member when the bump stopper is stretched.

* * * * *